United States Patent [19] [11] 3,876,508
Bonnema et al. [45] Apr. 8, 1975

[54] DISTILLATION OF ACRYLONITRILE FROM AQUEOUS SOLUTIONS MAINTAINED AT ABOUT PH3

[75] Inventors: Jentje Bonnema, Beek; Henri J. H. Simon, Geleen, both of Netherlands

[73] Assignee: Stamicarbon N.V., Van der Maesenstraat, Netherlands

[22] Filed: Aug. 7, 1973

[21] Appl. No.: 386,399

Related U.S. Application Data

[63] Continuation of Ser. No. 144,660, May 18, 1971, abandoned, which is a continuation-in-part of Ser. No. 42,870, June 2, 1970, abandoned.

[30] Foreign Application Priority Data
May 23, 1970 Netherlands................. 7007496
June 11, 1969 Netherlands................. 6908872

[52] U.S. Cl. ......... 203/35; 260/465.3; 203/DIG. 3
[51] Int. Cl. ............................................. E01d 3/34
[58] Field of Search............... 203/35, 34, 38, 6–8, 203/DIG. 3; 260/465.3, 465.9

[56] References Cited
UNITED STATES PATENTS
2,555,798   6/1951   Kropa .................................. 203/35
3,185,636   5/1965   Stevens et al. ....................... 203/35
3,257,445   6/1966   Roelen et al. ..................... 260/465.9
3,262,963   7/1966   Modiano et al. ................. 260/465.3
3,328,266   6/1967   Modiano et al. ................. 260/465.9

*Primary Examiner*—A. Louis Monacell
*Assistant Examiner*—Frank Sever
*Attorney, Agent, or Firm*—Cushman, Darby & Cushman

[57] ABSTRACT

A process relating to the manufacture of acrylonitrile is described with particular reference to the stripping technique for recovery of small amounts of dissolved acrylonitrile from the acidic aqueous solution obtained by the cooling of the hot reaction gases from the synthesis step itself. The disclosure points out that by maintaining the pH of the feed at a value of 5 or less and desirably also maintaining a bottom product temperature in the distillation column below 100° C, fouling of the distillation column is substantially obviated.

5 Claims, No Drawings

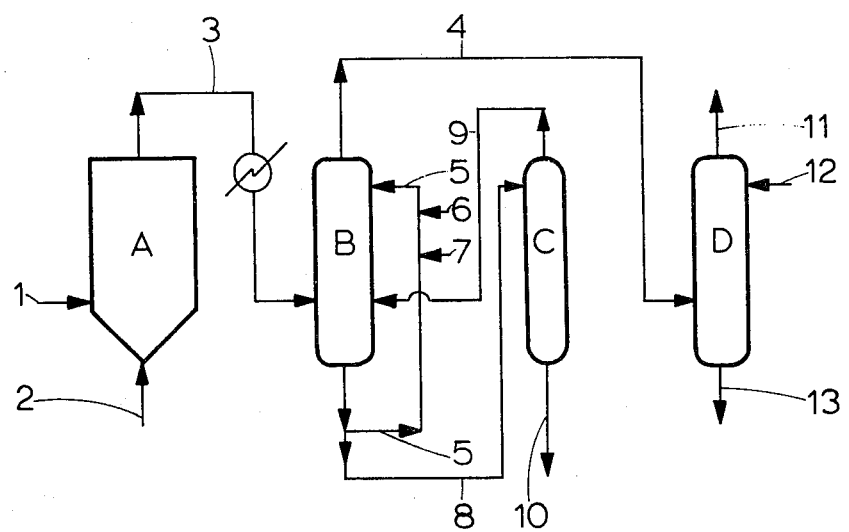

DISTILLATION OF ACRYLONITRILE FROM AQUEOUS SOLUTIONS MAINTAINED AT ABOUT PH3

This application is a continuation of our application S.N. 144660, filed 18 May 71, now abandoned, which is a continuation-in-part of our application S.N. 42870, filed 02 June 70, now abandoned.

The present invention relates to an improved processing of an aqueous ammonium salt solution contaminated by small amounts of acrylonitrile and which is obtained by the cooling of the hot reaction gases derived from the acrylonitrile synthesis in direct contact with an acid solution.

As is already known, acrylonitrile may be prepared according to the reaction equation:

$$H_2C = CH - CH_3 + NH_3 + 1\ \tfrac{1}{2}\ O_2 \rightarrow H_2C = CH - CN + 3\ H_2O$$

by passing a mixture of propylene, ammonia and air over a suitable oxidation catalyst at a temperature of 400°–600° C. Thereafter, the hot reaction gases are first contacted with dilute aqueous solution of a mineral acid, which causes the gases to cool down and the excess $NH_3$ present in the gas stream to be absorbed and combined as an ammonium salt. Further, a small amount of acrylonitrile, of the order of 3 percent of the quantity formed, is also dissolved, together with a minor quantity of other by-products.

An example of a composition of a solution to be processed, an exemplary solution contains per kg of solution:

| | |
|---|---|
| 138 | grams of ammonium sulphate |
| 7.8 | grams of acrylonitrile |
| 10.9 | grams of acetonitrile |
| 2.5 | grams of hydrocyanic acid |
| 4.4 | grams of cyanohydrin |

Prior to our invention it has been customary to recover the dissolved acrylonitrile from the solution containing the ammonium salt by distillation techniques or by stripping, which process, as a rule, is carried out at a moderate pressures and with bottom temperatures of the order of 120° C. During this procedure the distillation equipment has appeared to become seriously fouled, so that it must be taken out of operation periodically for cleaning.

Surprisingly, it has now been found that by judicious pH control of the solution to be distilled or stripped according to the present invention, acrylonitrile can be recovered from such solutions by distillation or stripping without the distillation column becoming fouled to any marked extent for a much longer period of time.

The present invention relates to a process for the recovery of acrylonitrile from an aqueous solution of an ammonium salt, contaminated with a minor amount of acrylonitrile, by distillation or stripping of the solution in a distillation column, in which the pH-value of the solution supplied to the distillation column is at most about 5. In principle, to establish the aforementioned required pH-value, any acid reacting agent may be added to the solution of the ammonium salt to be distilled. However, for the sake of simplicity and correct practice preference is given to the mineral acid from which the ammonium salt in the solution has been formed, such as for instance sulphuric acid or phosphoric acid.

The lower the pH-value of the solution is maintained, the less trouble is experienced in operation due to fouling of the distillation equipment. As is expected, the quantity of acid required for a decrease of a pH-unit increases with decrease of the pH, for reasons of economy and practical application, the pH of the solution to be distilled should not be too low and may for instance conveniently be between 3 and 4. Although it will be apparent that a pH of at most about 5 and lower than 1, or even less is operable, for the sake of economy and correct practice a pH of no less than about 3 is preferred.

According to the process of the present invention the solution of the ammonium salt contaminated with a small amount of acrylonitrile is introduced at the top of a distillation column. A solution of ammonium salt, which is virtually free from acrylonitrile, is discharged as the bottom product, whereas the top product, after condensation, yields an acrylonitrile solution of approximately 36 percent by weight.

It has further been found that the favorable effect brought about by the lower pH-value in reducing fouling is markedly enhanced if, in combination, the distillation process takes place at a pressure decreased an extent such that the bottom temperature remains less than 100° C. and preferably between about 40° and about 75° C. The reduced pressure employed is conveniently of the order of about 50 to about 275 mm Hg, although higher and lower pressures may be used.

A mixture of propylene and ammonia is fed to reactor A through conduit 1, air and, if desired, steam being introduced through conduit 2. The gaseous reaction mixture leaves the reactor through conduit 3, is cooled and fed to neutralization column B, where it is cooled and neutralized by a dilute sulfuric acid solution.

The aqueous ammonium sulfate solution is led through conduit 8 to the stripping column C (also called waste water column). Part of the ammonium sulfate solution is recirculated through conduit 5 and mixed with make-up water (conduit 7) and sulfuric acid (conduit 6).

In column C, acrylonitrile and other volatile compounds are stripped off and recirculated through conduit 9 to the neutralization column. The stripped ammonium sulfate solution is led away through conduit 10. The cooled and neutralized reaction gases flow through conduit 4 to absorption column, where acrylonitrile, acetonitrile and hydrocyanic acid are dissolved in water, introduced through conduit 12. Unreacted propylene and inert gases are vented through conduit 11 and the aqueous acrylonitrile solution flows to the recovery section through conduit 13.

A specific example of the invention is as follows:

EXAMPLE

An ammonium sulphate solution obtained during cooling of the reaction gases from the acrylonitrile synthesis was introduced at the top of a distillation column with some 15 theoretical trays at a rate of 1,169 g/hour. The solution which had a pH-value of 7 contained:

| | |
|---|---|
| 13.8% | by weight of ammonium sulphate |
| 0.78% | by weight of acrylonitrile |
| 0.09% | by weight of acetonitrile |
| 0.25% | by weight of hydrocyanic acid. |

Steam was blown into the bottom section of the column via a reboiler such that an hourly yield of 23 grams of condensate was obtained; the condensate contained 36 percent by weight of acrylonitrile. The composition of the bottom product was as follows:

| | |
|---|---|
| 14% | by weight of ammonium sulphate |
| 0.01% | by weight of acrylonitrile |
| 0.01% | by weight of acetonitrile |
| 0.005% | by weight of hydrocyanic acid | at a bottom temperature of 100° C. and a top temperature of 60° C.

Under these conditions the distillation column had to be taken out of operation after only 3 days owing to serious fouling. On the other hand, under the same distillation conditions as previously stated, the ammonium sulphate solution containing the small amount of acrylonitrile was distilled after the pH-value had been decreased from 7 to 5.0 by addition of sulphuric acid, the column had to be taken out of operation only after 7 days.

Further improvement was shown when operating under the same conditions but at a pH-value of 3.0 and at a pressure decrease in the column of 580 mm Hg. The distillation process was carried out at a bottom temperature of 65° C. and a top temperature of 50° C; the fouling observed was still very slight even after 8 weeks.

It will be appreciated that the practice of this invention is not limited to the specific conditions set forth in the working Example. Those skilled in the art will understand that distillation columns having varying plate efficiencies may be employed, though preferably with efficiency ratings in the range of 10 to 20 theoretical plates. Similarly, variations in the feed rate are possible, but the essential features to be observed to achieve full benefit of the invention disclosed herein are feeding the acrylonitrile containing ammonium salt solution to the top of the column; maintaining a pH of the solution fed to the column at a level less than about 5 and preferably maintaining a bottom temperature below 100° C.

What is claimed is:

1. In a catalytic process for producing acrylonitrile by reacting ammonia, air and propylene to produce a hot gaseous reaction mixture consisting essentially of small amounts of organic reaction products comprising acrylonitrile, acetonitrile, hydrocyanic acid, cyanohydrins and unreacted ammonia, cooling the gaseous reaction mixture in direct contact with mineral acid containing cooling water, whereby ammonia is removed from the reaction gases and an aqueous ammonium salt solution is formed in which minor parts of about 3% of the organic reaction products are dissolved, the improvement comprising recovering said organic reaction products from said aqueous ammonium salt solution including the steps of:
   a. adjusting the pH of the aqueous ammonium salt solution containing the dissolved organic reaction products to a value of about 3,
   b. feeding said aqueous ammonium salt solution containing the dissolved organic reaction products to a distillation column operating under reduced pressure while maintaining the bottom temperature of said distillation column between 40° and 100° C. to separate the dissolved organic reaction products from the salt solution and
   c. recovering the acrylonitrile present in the organic reaction products thus removed from the aqueous ammonium salt solution.

2. The process of claim 1 wherein said bottom temperature is maintained between about 40° C. and about 75° C.

3. In a catalytic process for producing acrylonitrile by reacting ammonia, air and propylene to produce a hot gaseous reaction mixture consisting essentially of small amounts of organic reaction products comprising acrylonitrile, acetonitrile, hydrocyanic acid, cyanohydrins and unreacted ammonia, cooling the gaseous reaction mixture in direct contact with mineral acid containing cooling water, whereby ammonia is removed from the reaction gases and an aqueous ammonium salt solution is formed in which minor parts of about 3 percent of the organic reaction products are dissolved, the improvement comprising recovering said organic reaction products from said aqueous ammonium salt solution including the steps of:
   a. adjusting the pH of the aqueous ammonium salt solution containing the dissolved organic reaction products to a value of about 3 by the addition of a strong mineral acid,
   b. feeding said aqueous ammonium salt solution containing the dissolved organic reaction products to a distillation column operating under a reduced pressure of about 50–275 mm Hg while maintaining the bottom temperature of said distillation column between 40° and 100°C. to separate the dissolved organic reaction products from the salt solution and
   c. recovering the acrylonitrile present in the organic reaction products thus removed from the aqueous ammonium salt solution.

4. The process of claim 3 wherein the strong mineral acid is sulfuric acid or phosphoric acid.

5. In a catalytic process for producing acrylonitrile by reacting ammonia, air and propylene to produce a hot gaseous reaction mixture consisting essentially of small amounts of organic reaction products comprising acrylonitrile, acetonitrile, hydrocyanic acid, cyanohydrins and unreacted ammonia, cooling the gaseous reaction mixture in direct contact with mineral acid containing cooling water, whereby ammonia is removed from the reaction gases and an aqueous ammonium salt solution is formed in which minor parts of about 3 percent of the organic reaction products are dissolved, the improvement comprising recovering said organic reaction products from said aqueous ammonium salt solution including the steps of:
   a. adjusting the pH of the aqueous ammonium salt solution containing the dissolved organic reaction products to a value of about 3,
   b. feeding said aqueous ammonium salt solution containing the dissolved organic reaction products to a distillation column to separate the dissolved organic reaction products from the salt solution and
   c. recovering the acrylonitrile present in the organic reaction products thus removed from the aqueous ammonium salt solution.

* * * * *